Patented Aug. 1, 1950

2,517,177

UNITED STATES PATENT OFFICE 2,517,177

METHOD OF PRODUCING HYDROGEN BY CONVERTING CARBON MONOXIDE WITH STEAM

Austin George Carter, Swansea, Wales, assignor to American Magnesium Metals Corporation, Pittsburgh, Pa.

No Drawing. Application June 15, 1946, Serial No. 677,086. In Great Britain August 28, 1945

5 Claims. (Cl. 23—213)

This invention relates to the manufacture of hydrogen by the interaction of carbon monoxide and steam or by eliminating carbon monoxide from gaseous mixtures containing a high percentage of hydrogen and a relatively low percentage of carbon monoxide such as water-gas.

In such a method of producing hydrogen by converting carbon monoxide or gaseous mixtures containing carbon monoxide with steam, with the employment of catalysts composed of magnesium oxide, alkali carbonate (preferably potassium carbonate), and carbonaceous substances the catalyst may contain, as an activator of this contact mass, not more than 10% of iron oxide in the form of natural iron ore, for instance utilising a catalyst in which the ratio of the quantity of iron oxide to the total quantity of $MgO+K_2CO_3$ in the catalyst is between 1:30 and 1:2. The catalyst may for example have the following composition:

| | Per cent |
|---|---|
| MgO (in the form of calcined or caustic burned magnesia | 13.5 |
| $Fe_2O_3$ (in the form of iron ore) | 1.5 |
| Potassium carbonate | 15.0 |
| Carbon | 70.0 |

The above ingredients are suitably incorporated with a suitable binding agent (for example wet asphalt), and the mixture passed through a pug mill. The finished mixture is then compressed and heated at a temperature of about 800° C., with the exclusion of air, for three to four hours.

It has now been found that when employing magnesium oxide as a catalyst for producing hydrogen by converting carbon monoxide with steam there is a liability of such catalysts to disintegrate and lose their catalytic property if the temperature and pressure conditions are such as to allow liquid water to react with any magnesium oxide which may be present to form or reform hydroxide of magnesium with the evolution of steam by the heat of the reaction. The steam so generated causes an internal rise of pressure sufficient to disintegrate the material to a fine powder which retains little or no catalytic influence. The conditions which bring this about are extremely difficult to avoid in practice. The presence of saturated steam is incidental to the operation of the process described as it is only with the greatest difficulty practicable under commercial conditions to avoid its formation notably when starting up or shutting down the process.

The instability of the catalyst is evidenced by the physical disruption of the catalyst briquette with formation of a loose powder of very low or zero catalytic activity. It has now been found that this is due to the hydration of the magnesia in the briquettes, which, in saturated steam, contain liquid water. The hydration process is increasingly rapid as the temperature rises above 100° C. and the heat evolved by hydration is not dissipated with sufficient rapidity to avoid generation of steam within the briquette. This results in the disintegration of the catalyst mass.

The object of the present invention is to provide improvements on or additions to hydrogen processes as indicated above.

As the result of researches it has been found, first that it is essential that the catalyst mass shall contain the hydroxide of magnesium or of another alkaline earth in contrast to the oxide of magnesium whether for instance the oxide be provided as such, or in the process of use by maintaining the corresponding hydroxide or carbonate at a temperature higher than the decomposition temperature of magnesium carbonate at which, even in the presence of steam, the oxide is formed. Further it has been found that the magnesium hydroxide or other alkaline earth hydroxide must be associated with certain other ingredients referred to below. Thus the hydroxides of magnesium and alkaline earth metals or mixtures of these when mixed with carbonaceous matter, and an alkali carbonate or hydroxide and suitably bound and formed, will exercise the required catalytic functions and the catalyst so formed is not subject to the disintegration disadvantage provided that the temperature and pressure during catalysis are so maintained that dissociation of the hydroxide of the magnesium or alkaline earth metal cannot take place, a condition which is far more easily achieved than that which is necessary to the successful operation of the magnesium oxide containing catalyst.

The relationship between the dissociation pressure and the dissociation temperature for any of the hydroxides named can be ascertained by reference to known and published data. The relationship so ascertained will indicate for any composition the range of inter-related temperatures and pressures within which the stability of the hydroxide and therefore of the catalytic mass is assured.

To illustrate the foregoing the temperatures at which certain hydroxides will dissociate with the formation of the oxides in the presence of a partial pressure of steam of one atmosphere are given below:

|  | °C. |
|---|---|
| Magnesium hydroxide | about 380 |
| Calcium hydroxide | about 547 |
| Strontium hydroxide | about 778 |
| Barium hydroxide | about 998 |

From the above and similar data the most suitable hydroxide to catalyse the reaction under predetermined conditions of temperature and pressure may be selected without difficulty.

The invention consists in a method of producing hydrogen by converting carbon monoxide or gaseous mixtures containing carbon monoxide with steam with the employment of catalyst masses comprising an agglomerated or briquetted mixture containing at least one of the materials in each of the following groups (a), (b) and (c), namely:

(a) Amorphous carbon;
(b) One or more of the hydroxides of magnesium, calcium, strontium, barium and beryllium;
(c) Alkali hydroxides or carbonates.

The invention also consists in a method in accordance with the preceding paragraph in which the catalyst mass contains the following ingredients within the ranges specified, namely:

|  | Per cent |
|---|---|
| Magnesium hydroxide | 20–50 | or a chemically equivalent amount of any other ingredient given in item (b) above, and

|  | Per cent |
|---|---|
| Potassium carbonate | from 5–20 | or a chemically equivalent amount of any ingredient given in item (c) above.

|  | Per cent |
|---|---|
| Amorphous carbon | to 100 |

The invention also consists in a method in accordance with either of the preceding two paragraphs in which the catalyst mass is prepared by mixing an oxide of magnesium or of barium, strontium, calcium, beryllium, or corresponding hydroxide or other substance convertible to the oxide form, or mixtures of two or more such oxides or hydroxides or, both with charcoal, activated carbon or carbonaceous matter which on calcination will produce amorphous carbon, and the other constituents for the catalyst mass, after which the mixture is heated to remove volatile matter and to convert the aforesaid convertible ingredient or ingredients into the oxide form and the product then treated with water for the conversion of the oxide or oxides into the corresponding hydroxide or hydroxides.

The invention also consists in methods of producing hydrogen by converting carbon monoxide or gaseous mixtures containing carbon monoxide with steam substantially as described below.

The invention also consists in hydrogen whenever produced by the methods according to either of the preceding four paragraphs.

In carrying the invention into effect in one form by way of example a catalyst is provided for suitable incorporation of the following ingredients in substantially the proportions given, namely:

| | | |
|---|---|---|
| Charcoal, 40 parts by weight | | =28% |
| Magnesium hydroxide, 58 parts by weight | | =40% |
| Ferric oxide, 5 parts by weight | | = 4% |
| Potassium carbonate, 15 parts by weight | | =10% |
| Aqueous emulsion of tar, 25 parts by weight | | =18% |
| | | 100% |

The magnesium hydroxide is preferably derived from caustic reactive magnesium oxide.

The charcoal and magnesium hydroxide are mixed together with the ferric oxide, and the mixture is then finely ground. Potassium carbonate is added to the fine powder which is then mixed with the aqueous tar emulsion together with sufficient water to make the mass into a moderately stiff dough. This is then allowed to dry in air for twenty-four hours, and is then granulated. The granules are further dried in an air oven at approximately 50° C. prior to briquetting.

The briquettes are calcined in an inert atmosphere at approximately 800° C. until volatiles have been substantially removed, are cooled, and hydrated by the application of water preferably as a fine spray which results in the reformation of the hydroxides of magnesium. The briquettes may then safely be exposed and dried in a warm current of air to a hard and resistant condition.

The catalyst briquettes thus formed may be employed in one way thus: 150 m.³/hour of water gas measured at 0° C. and 760 m. m. pressure containing about 40% CO is compressed to 150 lbs./square inch or about 15 kilogrammes per sq. cm. and mixed with steam in the proportion of 1.7 volumes of steam to one volume of water gas. The mixture of gases is heated so that the temperature is 340° C. entering the catalyser. The catalyser is a mild steel vessel suitably insulated 3'4" or about 1 metre inside diameter x 7' or about 2 metres overall length containing 43 cubic feet of briquetted catalyst. The temperature of the gases first increases in the catalyser to 460° C. and then decreases. The gases leave the catalyser at 380° C. After removing the carbon dioxide, formed in the reaction, the hydrogen contains 3% CO.

As an alternative to the aforesaid process 150 m.³/hour of water gas measured at 0° C. and 760 m. m. pressure containing about 40% CO is compressed to 150 lbs./square inch, say 15 kilogrammes per sq. cm., and mixed with steam in the proportion of 1 volume of steam to 1 volume of gas. The mixture is heated so that the temperature is 340° C. entering the catalyser. The catalyser is a mild steel vessel suitably insulated 2'6", say 0.75 metre, diameter x 5', say 1.5 metres, overall length containing 17.5 cubic feet or about 0.5 cubic metre of catalyst. The gases leave the catalyser at a temperature of 460° C. and are cooled down by known means to 410° C. and an additional 1 volume of steam added; this mixture now passes through a second catalyser made of mild steel and suitably insulated 3'4" or about 1 metre diameter x 19' or about 5.8 metres overall length containing 140 cubic feet, say 4 cubic metres, of catalyst. The gases leave the catalyser at a temperature of 380° C. After removing the carbon dioxide, formed in the reaction, the hydrogen contains less than 2% CO.

According to a further example, the following composition has been found to give good results:

| | |
|---|---|
| Charcoal, 40 parts by weight | =30% |
| Strontium hydroxide, 50 parts by weight | =37% |
| Ferric oxide, 5 parts by weight | = 4% |
| Potassium carbonate, 15 parts by weight | =11% |
| Aqueous emulsion of tar, 25 parts by weight | =18% |
| | 100% |

The strontium hydroxide should preferably be derived from caustic reactive strontium oxide, and the briquettes prepared by the method described in the previous example, the strontium hydroxide being thus converted into strontium oxide which is reconverted into the hydroxide.

The catalyst briquettes thus formed may be employed in accordance with the two detailed exemplifications which have been given above.

General

The ultimate ingredients of the catalyst mass have been given in items (a), (b) and (c) above. The starting materials for the ingredients given in item (b) must be the oxide or hydroxide, or compounds capable of forming the oxide on calcination and from that the corresponding hydroxide on subsequent treatment with water. The calcination temperature is determined by the decomposition characteristics of the compound chosen, but in any case it should be high enough to carbonise the carbonaceous material present, for which purpose a temperature within the range of 700–850° C. is generally satisfactory.

The preferred tolerance for the principal ingredients of the catalyst masses is shown by the ranges indicated above. As regards ferric oxide, when that is used the preferred tolerance is ±2½% with respect to the figure given in the examples.

The optimum temperature of reaction varies as the steam/carbon monoxide ratio is varied in order to achieve purer hydrogen at greater expense or less pure hydrogen more economically. The optimum temperature for the different catalyst mixtures lies between 350° C. and 500° C. At temperatures lower than 350° C. reaction takes place at a very slow rate and at temperatures in excess of 500° C. the equilibrium of reaction is increasingly displaced in the wrong direction resulting in inefficiency.

The quantity of steam present must always exceed the quantity of carbon monoxide measured by volume. A ratio of 4 volumes of steam to 1 volume carbon monoxide is satisfactory when using water gas. The optimum reaction temperature for this mixture lies between 400/450° C.

The main factor governing the pressure apart from the fact that the capital cost of plant for the production of a given quantity of hydrogen is lower if the process is operated at high pressure, is that the steam pressure must be such as will preclude the dissociation of the particular hydroxides in the catalyst at the maximum reaction temperature. In the case of magnesium hydroxide, a steam pressure of 10 atmospheres has been found to be satisfactory. In the case of strontium or barium hydroxides any steam pressure in excess of $\frac{1}{10}$ atmosphere may be used but 5 to 10 atmospheres is given by way of example for effecting economy in the capital cost of the plant.

This application does not extend to the production of the catalyst as such, that being claimed in a copending application filed by me on June 15, 1946, Serial No. 677,085, now Patent No. 2,470,688, or the employment of the catalyst in processes other than the production of hydrogen.

I claim:

1. That method of producing hydrogen which comprises providing granular catalyst formed of amorphous carbon, at least one hydroxide of a first group consisting of the hydroxides of magnesium, calcium, barium, strontium and beryllium, and at least one substance of a second group consisting of the alkali hydroxides and carbonates, and passing carbon monoxide and steam into contact with said catalyst at a temperature and under steam pressure such that the hydroxide of said first group remains a hydroxide during the entire reaction.

2. A method according to claim 1, the steam exceeding, by volume, the carbon monoxide.

3. A method according to claim 1 in which said carbon monoxide is provided by water gas, about four volumes of steam are supplied per volume of carbon monoxide, and the catalyst is maintained at about 400° C. to 450° C.

4. A method according to claim 1, said catalyst comprising 20 to 50 per cent of magnesium hydroxide, 5 to 20 per cent of potassium carbonate, in addition to said amorphous carbon.

5. A method according to claim 4 in which the catalyst is maintained at a temperature between about 350° C. and 450° C.

AUSTIN GEORGE CARTER.

REFERENCES CITED

The following references are of record in the file of this patent:

UNITED STATES PATENTS

| Number | Name | Date |
|---|---|---|
| Re. 19,733 | Hansgirg | Oct. 22, 1935 |
| 1,836,919 | Hansgirg | Dec. 15, 1931 |
| 2,147,780 | Von Kahler | Feb. 21, 1939 |
| 2,197,707 | Crittenden | Apr. 16, 1940 |